United States Patent [19]

Persyk et al.

[11] Patent Number: 4,656,359

[45] Date of Patent: Apr. 7, 1987

[54] SCINTILLATION CRYSTAL FOR A RADIATION DETECTOR

[75] Inventors: Dennis E. Persyk, Barrington; Everett W. Stoub, Villa Park, both of Ill.

[73] Assignee: Siemens Gammasonics, Inc., Des Plaines, Ill.

[21] Appl. No.: 838,879

[22] Filed: Mar. 10, 1986

Related U.S. Application Data

[63] Continuation of Ser. No. 549,865, Nov. 9, 1983, abandoned.

[51] Int. Cl.⁴ .................. G01J 1/58; G01N 21/64; G01N 23/38; G01T 1/00
[52] U.S. Cl. .................. 250/486.1; 250/483.1; 250/487.1; 250/488.1; 427/70
[58] Field of Search ............ 427/70; 250/483.1, 486.1, 250/487.1, 488.1

[56] References Cited

U.S. PATENT DOCUMENTS

| | | | |
|---|---|---|---|
| 3,011,057 | 11/1961 | Anger | 250/71.5 |
| 3,087,060 | 4/1963 | Omohundro et al. | 250/71.5 |
| 3,296,448 | 1/1967 | Swinehart et al. | 250/71.5 |
| 3,693,018 | 9/1972 | Spicer | 250/213 |
| 3,706,885 | 12/1972 | Fister et al. | 250/83.3 R |
| 3,980,888 | 9/1976 | Gudden et al. | 250/483 |
| 4,415,605 | 11/1983 | Davis et al. | 427/65 |

FOREIGN PATENT DOCUMENTS 991906 12/1965 United Kingdom .
1003220 12/1965 United Kingdom .

OTHER PUBLICATIONS

Health Physics, vol. 34, No. 5, May 1978, Pergamon Press Oxford, A. J. Ahlquist, "Recent Developments for Field Monitoring of Alpha-Emitting Contaminants in the Environment", pp. 486 to 489.

Primary Examiner—James R. Hoffman
Attorney, Agent, or Firm—Mark H. Jay

[57] ABSTRACT

A scintillation crystal is provided for a radiation detector, which comprises a first layer of a crystal material having relatively poor mechanical properties, however having a high energy resolution; and a second layer of a crystal material having relatively good mechanical and optical properties. Both layers are arranged in sandwich form.

24 Claims, 3 Drawing Figures

SCINTILLATION CRYSTAL FOR A RADIATION DETECTOR

This is a continuation of application Ser. No. 549,865, filed Nov. 9, 1983, now abandoned.

BACKGROUND OF THE INVENTION

1. Field of the Invention

The invention relates to a scintillation crystal for a radiation detector and method for producing the same. A special radiation detector in which use is made of a scintillation crystal according to the invention is a scintillation gamma camera of the Anger-type.

2. Description of Prior Art

The basic principle of a scintillation gamma camera of the Anger-type making use of a thallium-activated sodium iodide (NaI[Tl]) scintillation crystal is described in the U.S. Pat. No. 3,011,057 (Anger). NaI[Tl] has a relatively high energy resolution. However, its mechanical properties are relatively poor. Due to this it happens very often that the scintillation crystal breaks.

U.S. Pat. No. 3,693,018 (Spicer) illustrates an x-ray image intensifier tube having the photo-cathode formed directly on the pick-up screen. The x-ray sensitive phosphor of the pick-up screen is selected from the class consisting of alkali metal halides, preferably CsI, NaI or KI. The photo-cathode is preferably selected from the class of $C_3Sb$, $K_3Sb$ and $Rb_3Sb$. This enhances the quantum efficiency of the photo-cathode, thereby improving the sensitivity of the intensifier tube.

U.S. Pat. No. 3,980,888 (Gudden et al.) finally describes a self-supporting lumminescent screen. A carrier consisting of aluminum carries a layer of activated cesium iodide (CsI[Na]), that is deposited upon the carrier by evaporation.

SUMMARY OF THE INVENTION

Objects

It is an object of this invention to provide a scintillation crystal for a radiation detector, in particular a scintillation gamma camera, which has both a relatively high energy resolution and relatively strong mechanical properties.

It is another object of this invention to provide a method for producing such a scintillation crystal.

It is also another object of this invention to provide a method for producing a scintillation crystal which can be worked on under normal room conditions.

Summary

Accordng to this invention a scintillation crystal is provided for a radiation detector which comprises
  (a) a first layer of a crystal material having relatively poor mechanical properties, however having a high energy resolution; and
  (b) a second layer of a crystal material yielding relatively good mechanical and optical properties;
wherein both layers are arranged in sandwich form.

Also, according to this invention a method for producing a scintillation crystal is provided, which comprises the steps of
  (a) placing a substrate having a surface in an evaporation container;
  (b) placing a certain amount of a first crystal material yielding relatively good mechanical and optical properties in the evaporation container;
  (c) evaporating the first crystal material such that it deposits upon the surface of the substrate, thereby forming a second crystal layer;
  (d) placing a certain amount of a second crystal material having relatively poor mechanical properties, however having a high energy resolution in the evaporation container; and
  (e) evaporating the second crystal material such that it deposits as a first crystal layer upon the second crystal layer.

In a preferred embodiment of the invention the scintillation crystal also comprises a third layer of a crystal material yielding relatively good mechanical and optical properties, wherein the first layer is arranged in sandwich form between the second and third layer.

The scintillation crystal sandwich can be removed from the substrate if desired and bonded to another substrate which is part of a radiation detector (e.g. glass disc). However, when use is made of a substrate which is directly intended to become part of a radiation detector (e.g. glass disc) then the crystal sandwich must not necessarily be removed. Both this substrate and the crystal sandwich can be placed in the radiation detector.

Another preferred embodiment of the invention further comprises the step of annealing the scintillation crystal sandwich to improve its optical and scintillation properties.

According to this invention the first crystal layer having excellent scintillation properties is protected by means of the second (and preferably third) layer having good mechanical properties against shearing and thus breaking. Also according to this invention a first crystal layer having excellent scintillation properties and being normally very hygroscopic is passivated by a second (and third) crystal layer, which is (are) not so hygroscopic, so that when the finished sandwich is removed from an evaporator chamber, it may be worked on in a low humidity atmosphere, i.e. under normal room conditions.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

Figure 1:
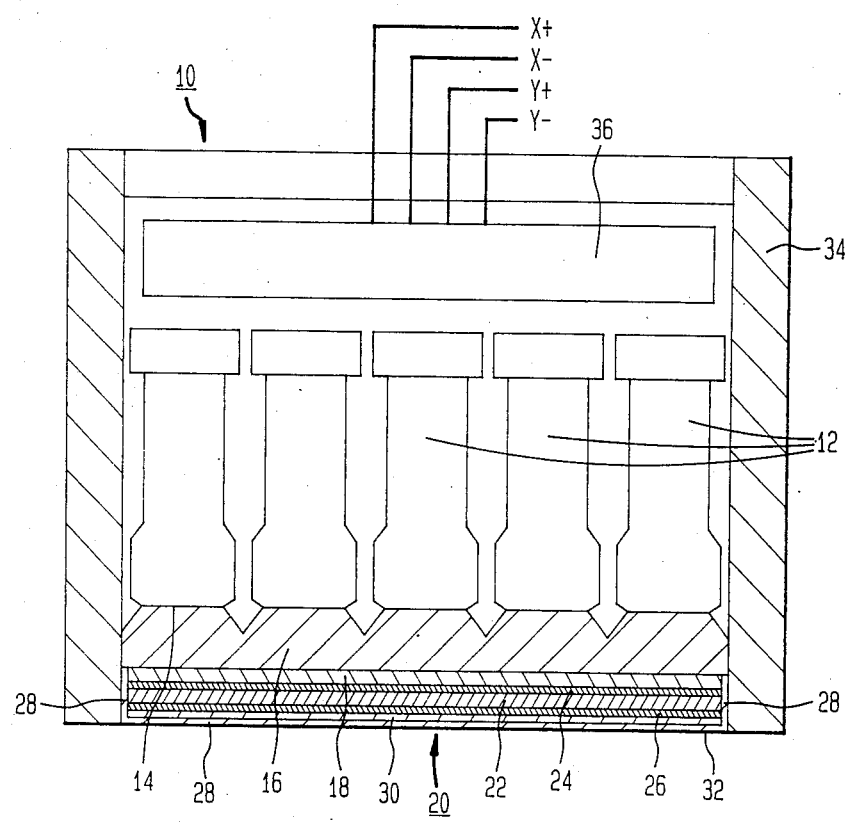
FIG. 1 is a diagrammatic side elevation and sectional view of a scintillation gamma camera head utilizing the invention in a first embodiment.

The scintillation gamma camera head 10 shown in FIG. 1 is of the Anger-type. It comprises a certain number (for example n=19) of photomultiplier tubes 12, which are arranged in a hexagonal array on circular pads 14 of a light conductor 16 (e.g. of Plexiglass). In front of the light conductor 16 there is arranged a glass cover disc 18 (e.g. ½ inch thick Pyrex glass with a diameter up to 18 inches or more), which is followed by a scintillation crystal 20.

The scintillation crystal 20 according to a first embodiment of the invention comprises a first layer 22 of a crystal material having relatively poor mechanical properties, however having a high energy resolution, such as for example thallium-activated sodium iodide (NaI[Tl]). It further comprises a second layer 24 and a third layer 26 of a crystal material having relatively good mechanical and optical properties. In particular the second and third layers are made of a crystal material selected from the groups consisting of cesium iodide (CsI), sodium-activated cesium iodide (CsI[Na] and thallium-activated cesium iodide (CsI[Tl]). The first layer 22, and the second layer 24 and the third layer 26 are arranged in sandwich form. The complete sandwiched scintillation crystal 20 is covered with an aluminum cover 28 having an inner surface covered with a reflecting layer 30 made of, for instance, magnesium oxide (MgO). There is also a thin air gap 32 between crystal sandwich and aluminum cover.

The housing of the scintillation gamma camera head 20 is indicated with 34. The incidence of a gamma particle on the material of the first layer 22 of the scintillation crystal 20 produces visible photons which move via light conductor 16, at the input of the photomultiplier tubes 12. An electronic calculation network 36 applies deflection signals X+, X−, Y+, Y− in well known manner to a cathode ray tube or a digital display device (not shown).

Figure 2:
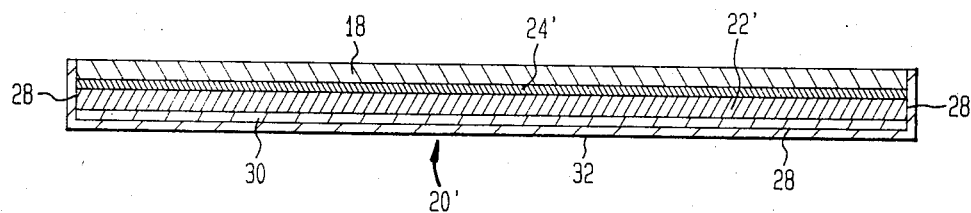
FIG. 2 is a second embodiment of the invention.

FIG. 2 illustrates a second embodiment of the invention. In this case the scintillation crystal 20' comprises again a first layer 22' of a crystal material having relatively poor mechanical properties, however having a high energy resolution (e.g. NaI[Tl]). However, instead of two further layers it comprises merely a second layer 24' of a crystal material having relatively good mechanical and optical properties (e.g. CsI, CsI[Na] or CsI[Tl]), wherein both layers are arranged in sandwich form.

In both embodiments the thickness of the first layer 22 or 22' of the scintillation crystal 20 or 20' is in the range of $\frac{1}{4}$ inch to about 1 inch, depending on the energy of the gamma rays being detected.

In practice most gamma interactions should take place in the first layer 22 or 22' of the scintillation crystal 20 or 20'. Due to this second layer 24 or 24' and third layer 26 should be thin with respect to the thickness of the first layer 22 or 22'. Their thicknesses preferably lie in the order of 0.1 mm (0.004 inch) to about 1 mm (0.04 inch). This is thin enough so that the second and third layers do practically not contribute to the scintillation properties of the sandwich. However, these second and third layers are thick enough to absorb mechanical shears between glass disc 18 or if there exist any, also between aluminum cover 28 and first layer 22 or 22'.

The second and third layers 24 or 24' and 26 have still other very important advantages. As is well known in the art crystal material NaI[Tl] having excellent scintillation properties is very hygroscopic, requiring handling in dew points of −50° C. or less. Special relatively costly procedures and room conditions have to be provided to produce scintillation crystals from such a crystal material.

Enclosing a first layer of a crystal material, which has excellent scintillation properties however which is very hygroscopic, namely NaI[Tl], in a second and a third layer of a crystal material which is not so hygroscopic, namely for example crystal material selected from the group consisting of cesium iodide (CsI), sodium-activated cesium iodide (CsI[Na]) and thallium-activated cesium iodide (CsI[Tl]), provides an interim kind of "hermetic seal" to keep moisture away from the first layer beneath. This allows subsequent canning operation to procede in a normal low humidity working atmosphere (normal room conditions). A special glovebox atmosphere of −50° C. dew point is no longer required.

The second crystal layer 24 or 24' solves also the problem of thermal coefficient of expansion mismatch between the first crystal 22 or 22' and the glass disc 18.

Figure 3:
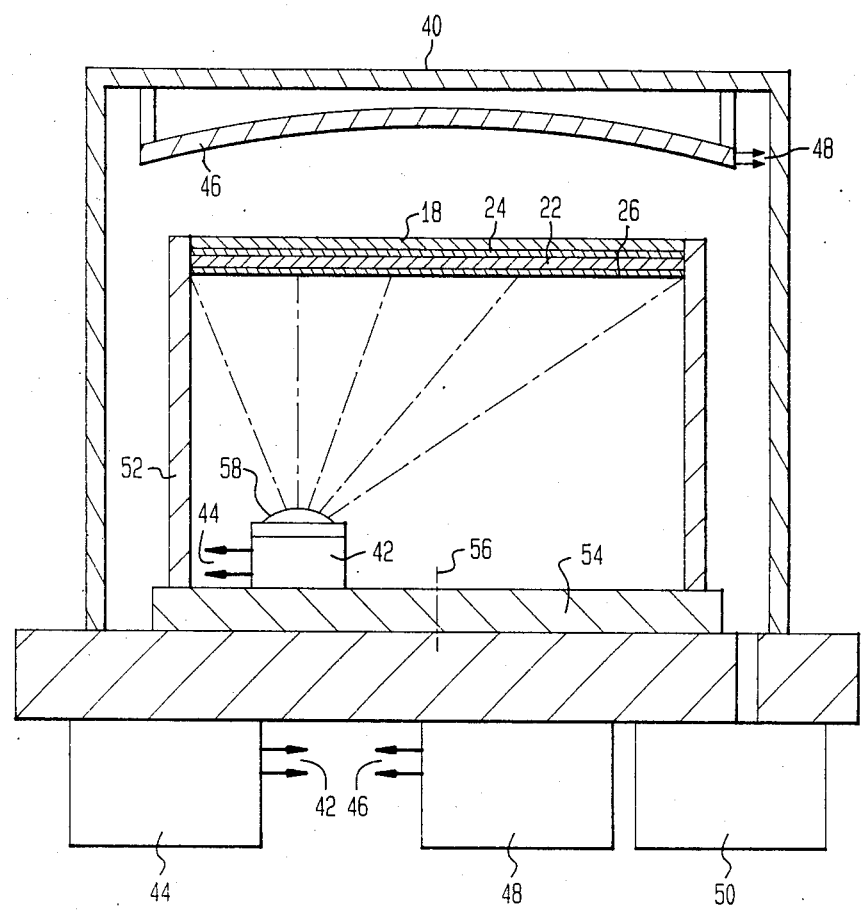
FIG. 3 is a diagrammatic side elevation and sectional view of an evaporator chamber for producing a scintillation crystal according to this invention.

A method for producing a crystal sandwich 20 or 20' according to this invention is as follows:

1. the glass disc 18 is arranged in a suitable container for evaporation comprising a heater;
2. a certain amount of a crystal material selected of the group consisting of CsI, CsI[Na] or CsI[Tl] is placed in the evaporation container;
3. this crystal material is then evaporated by the heater such that it is deposited upon one surface of the glass disc as the second layer 24 or 24' of the crystal sandwich;
4. then a certain amount of NaI and TlI is placed in the evaporation chamber;
5. this crystal material NaI and TlI is then evaporated by the heater such that it is deposited upon the second layer 24 or 24' as the first layer 22 or 22' of the crystal sandwich;
6. in case of the embodiment of FIG. 2 the crystal sandwich 20' after preceding annealing is then removed and sealed with aluminum cover 28;
7. however, in case of the embodiment of FIG. 1 steps 2 and 3 are repeated to form the third layer 26, which is then after preceding annealing sealed with aluminum cover 28;

An evaporation chamber 40 for evaporation according to the invention is shown in FIG. 3. The chamber 40 comprises an evaporator 42 which is supplied with heater current from a first current source 44. It also comprises a radiant heater 46 which is supplied by a second current source 48. A vacuum pump 50 evacuates the chamber 40. The glass disc 18 is located inside the chamber 40 by means of a support 52, 54, which is rotatable around axis 56. A crystal material to be evaporated is generally indicated with 58.

Having thus described the invention with particular reference to the preferred forms thereof, it will be obvious to those skilled in the art to which the invention pertains, after understanding the invention, that various changes and modifications may be made therein without department from the spirit and scope of the invention as defined by the claims appended hereto.

What is claimed is:

1. A scintillation crystal for a radiation detector, comprising:
   (a) a first layer of a crystal material which has a high energy resolution; and
   (b) a second layer of a different crystal material, said second layer being located on top of said first layer and being thin with respect thereto, the second layer protecting the first layer against breakage and making a negligable contribution to the scintillation properties of the first layer.

2. A scintillation crystal according to claim 1, wherein said first layer is made of thallium-activated sodium iodide (NaI[Tl]).

3. A scintillation crystal according to claim 1, wherein said second layer is made of a crystal material selected from the group consisting of cesium iodide (CsI), sodium-activated cesium iodide (CsI[Na]) and thallium-activated cesium iodide (CsI[T1]).

4. A scintillation crystal according to claim 1, wherein the first layer has a thickness in the range of ¼ inch to 1 inch.

5. A scintillation crystal according to claim 1, wherein the second layer has a thickness in the range of 0.1 mm to 1 mm.

6. The scintillation crystal of claim 1, further comprising a third layer of a crystal material, said first layer being sandwiched between said second and third layers.

7. A scintillation crystal according to claim 6, wherein said third layer is made of a crystal material selected from the group consisting of cesium iodide (CsI), sodium-activated cesium iodide (CsI[Na]) and thalliun-activated cesium iodide (CsI[T1]).

8. A scintillation crystal according to claim 6, wherein said first layer is made of thallium-activated sodium iodide (NaI[T1]) and said second and third layers are made of a crystal material selected from the group consisting of cesium iodide (CsI), sodium-activated cesium iodide (CsI[Na]) and thallium-activated cesium iodide (CsI[Te]).

9. A scintillation crystal according to claim 6 wherein the third layer has a thickness in the range of 0.1 mm to 1 mm.

10. A method for making a scintillation crystal, comprising the following steps:
    (a) placing a substrate having a surface in an evaporation container;
    (b) evaporating within said container a first crystal material such that it deposits upon said surface to form a second crystal layer; and
    (c) evaporating within said container a second crystal material such that it deposits upon the second crystal layer as a first crystal layer to form a two-layer crystal sandwich, the second crystal material having a high energy resolution.

11. A method according to claim 10, further comprising the step of sealing the two-layer crystal sandwich with a metal cover.

12. A method according to claim 10, wherein said first crystal material is selected from the group consisting of cesium iodide (CsI), sodium-activated cesium iodide (CsI[Na]) and thallium-activated cesium iodide (CsI[T1]).

13. A method according to claim 10, wherein said second crystal material is thallium-activated sodium iodide (NaI[T1]).

14. A method according to claim 10, further comprising the step of annealing the two-layer crystal sandwich.

15. The method of claim 10, further comprising the step of evaporating within said container a third crystal material such that it deposits upon the first crystal layer as a third crystal layer to form a three-layer crystal sandwich.

16. A method according to claim 15, further comprising the step of sealing the three layer crystal sandwich with a metal cover.

17. A method according to claim 15, wherein said third crystal material is selected from the group consisting of cesium iodide (CsI), sodium-activated cesium iodide (CsI[Na]) and thallium-activated cesium iodide (CsI[T1]).

18. A method according to claim 15, wherein said second crystal material is thallium-activated sodium iodide (NaI[T1]) and wherein the first and third crystal material are selected from the group consisting of cesium iodide (CsI), sodium-activated cesium iodide (CsI[Na]) and thallium-activated cesium iodide (CsI[T1]).

19. A method according to claim 18, further comprising the steps of sealing the three-layer crystal sandwich with an aluminum cover.

20. A method according to claim 15, further comprising the step of annealing the three-layer crystal sandwich.

21. A radiation detector, comprising a scintillation crystal which comprises:
    (a) a first layer of a crystal material having a high energy resolution; and
    (b) a second layer of a crystal material, said second layer being located on top of said first layer and being thin with respect thereto, the second layer protecting the first layer against breakage and making a negligable contribution to the scintillation properties of the first layer.

22. The radiation detector of claim 21, further comprising a gamma-radiation scintillation camera head containing said scintillation crystal.

23. A scintillation crystal, comprising:
    a first layer of thallium-activated sodium iodide (NaI[T1]); and
    a secnd layer selected from the group consisting of cesium iodide (CsI),
        sodium-activated cesium iodide (CsI[Na]) and
        thallium-activated cesium iodide (CsI[T1]),
    said second layer being thin with respect to said first layer and protecting it against breakage and making a negligible contribution to its scintillation properties.

24. The scintillation crystal of claim 23, further comprising a third layer selected from the group consisting of
    cesium iodide (CsI),
    sodium-activated cesium iodide (CsI[Na]) and
    thallium-activated cesium iodide (CsI[T1]),
    said first layer being sandwiched between said second and third layers.

* * * * *